US010733653B2

(12) United States Patent
Smalley et al.

(10) Patent No.: US 10,733,653 B2
(45) Date of Patent: Aug. 4, 2020

(54) SYSTEM AND METHOD FOR ALTERNATIVE PRODUCT SELECTION AND PROFITABILITY INDICATION

(71) Applicant: MSC Services Corp., Melville, NY (US)

(72) Inventors: John Anthony Smalley, Holbrook, NY (US); Denis Diakoniarakis, East Rockaway, NY (US); Prabhu M Shanmugam, Syosset, NY (US); Stanley Widziunas, Huntersville, NC (US); Richard Scott Zagon, Commack, NY (US)

(73) Assignee: MSC Services Corp., Melville, NY (US)

( * ) Notice: Subject to any disclaimer, the term of this patent is extended or adjusted under 35 U.S.C. 154(b) by 0 days.

(21) Appl. No.: 15/672,963

(22) Filed: Aug. 9, 2017

(65) Prior Publication Data

US 2019/0050929 A1    Feb. 14, 2019

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0629* (2013.01); *G06Q 30/0206* (2013.01); *G06Q 30/0627* (2013.01); *G06Q 30/0631* (2013.01)

(58) Field of Classification Search
CPC .............. G06Q 30/00; G06Q 30/0601; G06Q 30/0641; G06Q 40/00; G06Q 40/02; G06Q 30/0627; G06Q 30/0629
See application file for complete search history.

(56) References Cited

U.S. PATENT DOCUMENTS

| | | | | |
|---|---|---|---|---|
| 5,689,651 A | * | 11/1997 | Lozman | G06Q 40/02 705/37 |
| 5,751,819 A | * | 5/1998 | Dorrough | H04R 29/008 381/119 |
| 7,155,401 B1 | * | 12/2006 | Cragun | G06Q 30/02 705/7.31 |

(Continued)

OTHER PUBLICATIONS

Beck, Thorsten, and Asli Demirguc-Kunt. Financial institutions and markets across countries and over time-data and analysis. The World Bank, 2009. (Year: 2009).*

*Primary Examiner* — Christopher B Seibert
(74) *Attorney, Agent, or Firm* — Patent Technologies, LLC; Robert D. Gunderman, Jr.

(57) ABSTRACT

A computer based system and method for optimizing product selection is disclosed. The system has a financial measurement gauge that is stored on computer readable media and graphically displayed on a computer monitor. The financial measurement gauge has a central symbol with a plurality of marks on either side of the central symbol. The marks may take on a color; the color and placement of the marks in relationship to the central symbol being indicative of the profitability to the seller of the product being displayed with a given query.

The system thus provides methods of alternative product selection that are coupled to the financial measurement gauge to optimize product selection based in part on seller profitability and value to the customer.

21 Claims, 7 Drawing Sheets

(4 of 7 Drawing Sheet(s) Filed in Color)

(56) References Cited

U.S. PATENT DOCUMENTS

| | | | | |
|---|---|---|---|---|
| 2001/0021914 A1* | 9/2001 | Jacobi | ............... | G06Q 30/02 |
| | | | | 705/14.53 |
| 2004/0049470 A1* | 3/2004 | Ouimet | ............ | G06Q 30/0202 |
| | | | | 705/400 |
| 2006/0047563 A1* | 3/2006 | Wardell | ............ | G06Q 30/02 |
| | | | | 705/14.67 |
| 2007/0055585 A1* | 3/2007 | Agrawal | ............ | G06Q 40/00 |
| | | | | 705/28 |
| 2008/0027787 A1* | 1/2008 | Malsbenden | ...... | G06Q 30/0631 |
| | | | | 705/7.29 |
| 2009/0043597 A1* | 2/2009 | Agarwal | ............ | G06Q 30/02 |
| | | | | 705/14.1 |
| 2009/0281884 A1* | 11/2009 | Selinger | ............ | G06Q 30/0631 |
| | | | | 705/14.4 |
| 2013/0024349 A1* | 1/2013 | Venkatesan | ............ | G06Q 40/04 |
| | | | | 705/37 |
| 2014/0172751 A1* | 6/2014 | Greenwood | ............ | G06Q 40/06 |
| | | | | 705/36 R |

* cited by examiner

SYSTEM AND METHOD FOR ALTERNATIVE PRODUCT SELECTION AND PROFITABILITY INDICATION

BACKGROUND OF THE INVENTION

1. Field of the Invention

This disclosure relates generally to products supporting a sales negotiation process, and more particularly, to a system and method for determining and visualizing optimal product selection choices for a vendor to present to a client.

2. Description of Related Art

As supply chain complexities continue to increase, and the widespread use of computer systems to aid in supply and fulfillment continue to evolve, the sales process itself becomes more complex and more in need of useful and efficient systems to support product sales and alternative product selection and presentation to a customer. The supply of parts, components and products in general faces a continuum of rapidly changing, highly competitive and often overlapping assortment of products. In this myriad of products, some products meet a customer's needs better than others.

In addition, the salesperson for the supplier confronts competition with other suppliers in addition to competing products, parts and components and the proper selection thereof. The salesperson must not only present the best product selections to the customer, but must also do so in the best interests of the company represented by the salesperson. To make the job of the salesperson yet more stressful, the sales process itself must often be conducted under considerable time pressure, in which the supplier's salesperson must quickly locate a product that most closely fits the customer's needs, is readily available, and also falls within the business objectives of the supplier.

The process of rating products against the needs of the customer is complex. Computer search, evaluation, and display methods greatly alleviate the salesperson's burden in the successful conduct of the sales process. There is need for continuing advancement of these methods in order to simplify the effort involved and facilitate quicker and mutually-more-satisfying completion of the sales process. While the areas of improved product selection based on comparison alternative product features continue to improve, there is a stark lacking of product comparison and alternative product selection that also integrates profitability measurements for the supplier. While the profitability of the supplier may not appear important to a customer whose main focus is on product cost and features, selecting the best alternative product based on not only cost and features but also profitability to the supplier results in a financially healthy supplier that is better able to serve the customer in the future.

What is needed is a system and method for alternative product selection and profitability that considers and integrates both the goals of the customer as well as the goals of the supplier while making the job of alternative product presentation and selection easier for the salesperson and the customer.

The present invention provides such alternative product selection and profitability systems and methods as further described herein. Various embodiments of the present invention will further become evident to one skilled in the art after a review of this specification, claims, and the attached drawings.

BRIEF SUMMARY OF THE INVENTION

In accordance with the present invention, there is provided a system for optimizing product selection to a user, the system comprising a computer having a processor, memory, and access to computer readable media; a computer program stored on computer readable media having a customer profile module, a product information module, a product match module, a product sort module, and a profitability indicator module; a user interface displayed on a computer monitor for interaction with said computer program; a network connection between the computer and a computer network for allowing remote access to the computer program; a financial measurement gauge stored on computer readable media and graphically displayed on a computer monitor having a central symbol with a plurality of marks displayed on the left side of the central symbol and a plurality of marks displayed on the right side of the central symbol, wherein the marks on the left side of the central symbol take on a first color to indicate a less profitable product being displayed, and the marks on the right side of the central symbol alternatively take on a second color to indicate a more profitable product being displayed, the quantity of marks that take on either color being proportional to the magnitude of profitability of the product being displayed and the color being indicative of the direction of profitability of the product being displayed; the profitability indicator module being operatively coupled with the financial measurement gauge to display a visual indication of the profitability of each product selected by the product match module.

In one aspect of this disclosure, a system is disclosed for retrieving, computing, rating, and presenting a set of alternative products from an online catalogue, rated according to criteria submitted by a salesperson. When a salesperson searches the online catalogue for a product for a customer, the alternatives engine of the present disclosure collects data for that product, including such variables that may be relevant to that product, such as color, size, price and supplier, and also may collect information about the customer as specified by the salesperson, including for example applicable discounts and purchase history information. The alternatives engine of the present invention then suggests other alternative products that closely match the searched product and are available from other suppliers in the same catalogue or similar online system.

In another aspect of this disclosure, the alternatives engine of the present invention provides textual and graphical information about the profit margin that can be achieved by the supply company for each suggested product to the salesperson, such that the salesperson can easily and quickly provide appropriate alternatives to the customer, taking into account such business factors as customer specific discounts and the potential for future business. The foregoing has outlined rather generally the features and technical advantages of one or more embodiments of this disclosure in order that the following detailed description may be better understood. Additional features and advantages of this disclosure may also be determined after reading this specification with the accompanying drawings and claims.

The foregoing paragraph has been provided by way of introduction, and is not intended to limit the scope of this invention as defined by this specification, claims, and the attached drawings.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

The invention will be described by reference to the following drawings, in which like numerals refer to like elements, and in which.

The present invention will be described in connection with a preferred embodiment; however, it will be understood that there is no intent to limit the invention to the embodiment described. On the contrary, the intent is to cover all alternatives, modifications, and equivalents as may be included within the spirit and scope of the invention as defined by this specification, claims, and the attached drawings.

DESCRIPTION OF THE PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

For a general understanding of the present invention, reference is made to the drawings. In the drawings, like reference numerals have been used throughout to designate identical elements.

This application discloses a system for providing and displaying alternative product information to a user who may be a salesperson. Alternative product information includes not only information that is directly important to a customer, such as price, availability and features, but also information that is important to the supplier and impacts the business relationship between supplier and customer, such as financial parameters of the alternative product selection including, but not limited to, profitability of the alternative product selection. Selection of an alternative product that meets the needs of the customer and is also profitable to the supplier creates a healthy business relationship between supplier and customer that allows the supplier to provide better service and support to the customer and offer better options for the customer. Integration of a novel financial measurement gauge and associated financial parameters with an alternative product engine will be described by way of the following disclosure in conjunction with the attached drawings.

Figure 1:
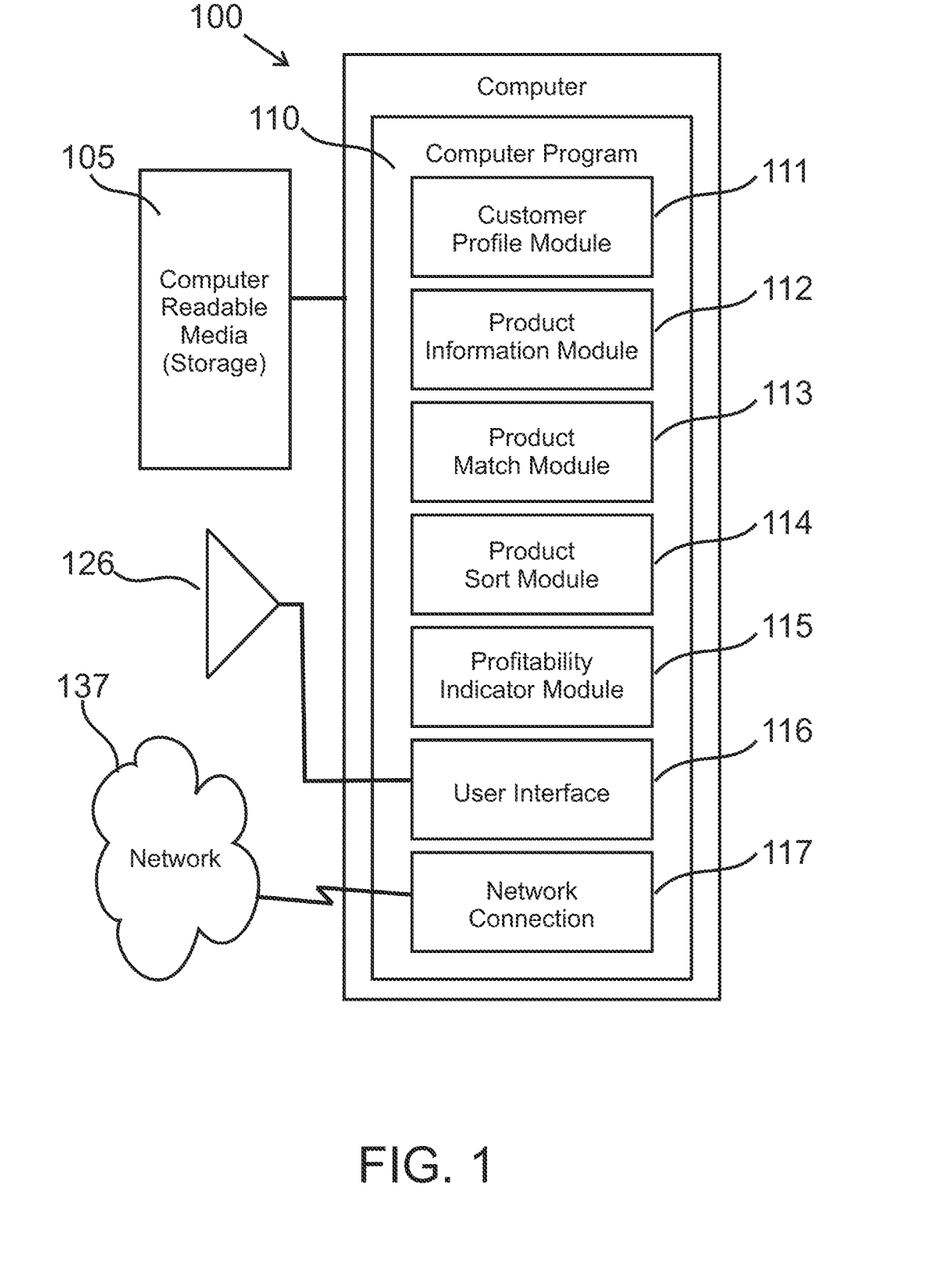
FIG. 1 is a high-level block diagram of the system for alternative product selection and profitability indicators.

Referring first to FIG. 1, the system comprises a computer 100 having a processor, memory, and access to computer readable media, with a computer program 110 stored on computer readable media 105. The computer program 110 incorporates a customer profile module 111, a product information module 112, a product match module 113, a product sort module 114, and a profitability indicator module 115. The system also incorporates a user interface 116 displayed on a computer monitor 126 for interaction with said computer program, a network connection 117 between the computer and a computer network 137 for allowing remote access to and from the computer program.

Figure 2:
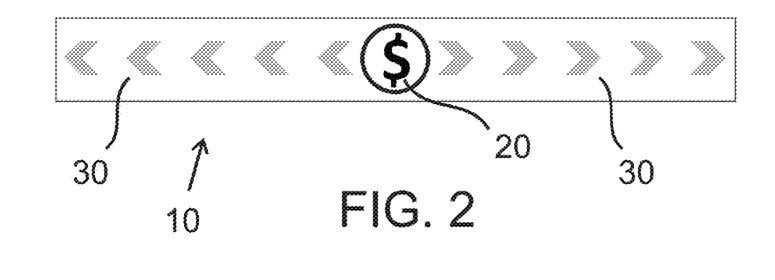
FIG. 2 shows the profitability indicator display of the financial measurement gauge.

Referring now to FIG. 2, the system presents to a user a financial measurement gauge stored on computer readable media and graphically displayed on a computer monitor as a profitability indicator 10. The profitability indicator 10 comprises a central symbol 20 with a plurality of marks 30 displayed on the left side of the central symbol and a plurality of marks 30 displayed on the right side of the central symbol.

The central symbol 20 in some embodiments of the present invention takes the form of a monetary amount symbol, for example, a dollar sign, a Euro symbol, a pound-sterling symbol, or other typographical indicator designating a monetary amount.

The plurality of marks displayed on either side of the central symbol is equal in number to the number of categories (buckets') of profitability. The number of marks taking on a more contrastive appearance in the display for a product conveys the profitability category of the product with which it is displayed. Quantity of marks on either side of the central symbol may also be visually enhanced to communicate further indication of a financial state of an alternative product. Such visual enhancement may include, for example, shading, coloring, outlining, or the like.

Figure 2A:
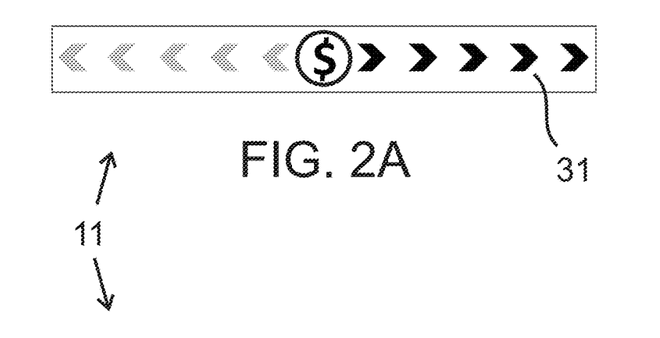
FIG. 2A shows the profitability indicator display indicating a most-profitable product.
Figure 2B:
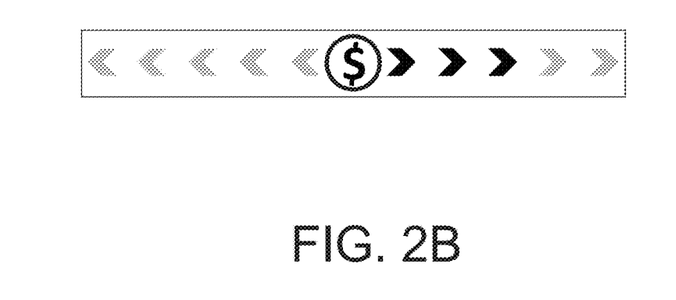
FIG. 2B shows the profitability indicator display indicating a moderately-profitable product.
Figure 2C:
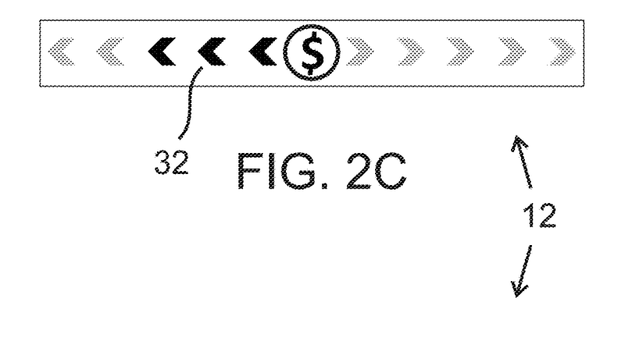
FIG. 2C shows the profitability indicator display indicating a moderately-unprofitable product.
Figure 2D:
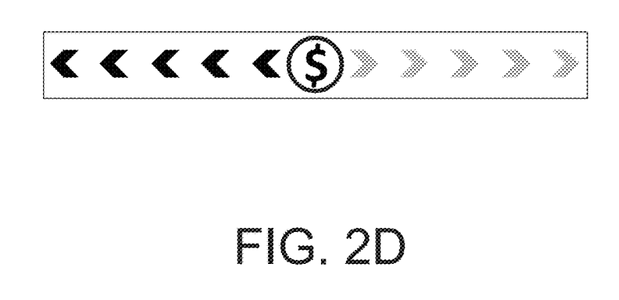
FIG. 2D shows the profitability indicator display indicating a most-unprofitable product.

See FIGS. 2A and 2B for examples of various states of the financial measurement gauge that are driven by inputs from alternative product selections being made by a user operating the system. When a more profitable product is being displayed using the profitability indicator 11, one or more marks 31 on the right side of the central symbol beginning with the mark nearest the central symbol and continuing contiguously rightward away from the central symbol, take on a first contrastive appearance. Alternatively, as shown in FIGS. 2C and 2D, when a less profitable product is being displayed using the profitability indicator 12, one or more marks 32 on the left side of the central symbol, beginning with the mark nearest the central symbol and continuing contiguously leftward away from the central symbol, take on a second contrastive appearance, likewise rendering said marks more highly visible in the display. In either case the number of marks 31, 32 that take on a contrastive appearance conveys to the user the magnitude of profitability of the product being displayed, and the choice of the contrastive appearance of the marks is indicative of the direction of profitability of the product being displayed.

The number of marks conveying the magnitude of profitability of the product being displayed is in proportion to said magnitude according to tabulation of separate and adjacent percentage intervals, as described herein and below.

When multiple alternative products are found through a query made by the system or an ancillary or networked system, they are displayed with their attributes together with the product entered by the salesperson and its attributes. A fixed number of the totality of alternative products is displayed, in sorted order with best matching first, with scrolling or paging provided by the user interface to display additional alternative products. Sorting rules may be specified by a user, or may be hard coded into the system of the present invention or otherwise specified.

For example, in one embodiment of the present invention the sorting rules specify a grouping of products (items) in the following order:

By the match level of their critical attributes, i.e., how closely the found alternative product resembles the entered product, in one of several buckets each for a different range of match level;

Within each critical match bucket, items with inventory before those without inventory;

Within each of the two inventory categories, item status (active first, then phased-out);

Within each of the status categories, a specified or determined supplier classification in descending order;

Within each supplier classification, the item's profitability (bucket);

Within each profitability bucket, the item selling price;
For items with the same selling price, the frequency with which each item is picked from a supplier's warehouse (item popularity).

Profitability is determined on a customer-specific basis. When a customer is selected the profit dollars are determined based on the customer specific price, during the price and inventory call. When a selected customer has a specific price for the item, then that customer specific price is to be used to determine the profitability.

Profitability is determined by comparing the profitability of the similar (alternative) items to the primary (entered) item and computing a percentage for each alternative item as follows:
(Alternative Item Profit—Entered Item Profit)/Entered Item Profit In other words, the profit for the entered product is subtracted from the profit for the displayed product, and the resulting difference is divided by the profit for the entered product to give a resulting percentage value based on the entered product's profit value.

The resulting profit percentage is applied to a set of percentage intervals, or 'buckets', ranging in value from positive values exceeding 100% to negative values less than −100%, with an equal number of positive and negative buckets, and a single additional bucket interval spanning 0%.

The tabulation of percentage intervals, or 'buckets', with the profitability indicated for each 'bucket' is shown in Table 1. The number of intervals in Table 1, the boundary definitions of each interval (the 'From %' and 'To %' values specified for the interval), and the textual and mark-specifying values for the interval are presented by way of example and not limitation.

TABLE 1

| From % | To % | Bucket (In a color-display embodiment, green > will be used for profitable items and red < will be used for less profitable items. |
|---|---|---|
| −2.5% | 2.5% | Same Profit as primary (no marks shown) |
| 2.6% | 6.3% | > (More profitable than primary) |
| 6.4% | 15.6% | >> (Much more profitable than primary) |
| 15.7% | 39.1% | >>> (Much much more profitable than primary) |
| 39.2% | 97.7% | >>>> (Much much much more profitable than primary) |
| 97.8% | + | >>>>> (Much much much much more profitable than primary) |
| −2.6% | −6.3% | < (Less profitable than primary) |
| −6.4% | −15.6% | << (Much less profitable than primary) |
| −15.7% | −39.1% | <<< (Much much less profitable than primary) |
| −39.2% | −97.7% | <<<< (Much much much less profitable than primary) |
| −97.8% | − | <<<<< (Much much much much less profitable than primary) |

The resulting percentage value is compared against the tabulation of percentage intervals as shown in Table 1 to determine which interval contains the resulting percentage value. Thus for example, if a resulting percentage value is calculated to be −27%, the interval containing it is the ninth in Table 1, defining the range −15.7% to −39.1%. The number of marks for the ninth table entry is three, and their direction is leftward, indicating less profitability for the displayed product than that for the entered product.

Marks are presented in a left form of mark on the left side of the central symbol and a right form of mark on the right side of the central symbol. Left and right forms of marks include, but are not limited to, chevrons, arrows, arrowheads, triangles, guillemets (double chevrons) and other pairs of left-indicating and right-indicating symbols respectively. With some embodiments of the present invention, the left and right marks have a further indication of directionality.

Figure 2E:
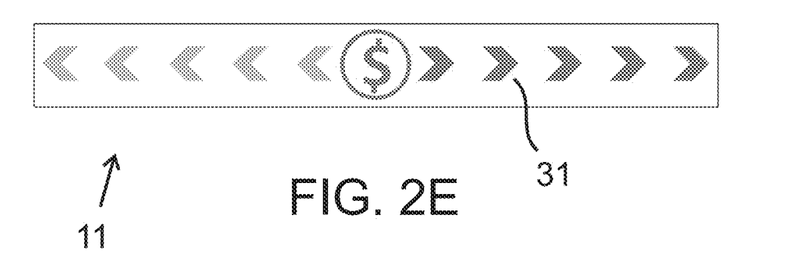
FIG. 2E shows the profitability indicator display indicating a most-profitable product where color further signifies profit.
Figure 2F:
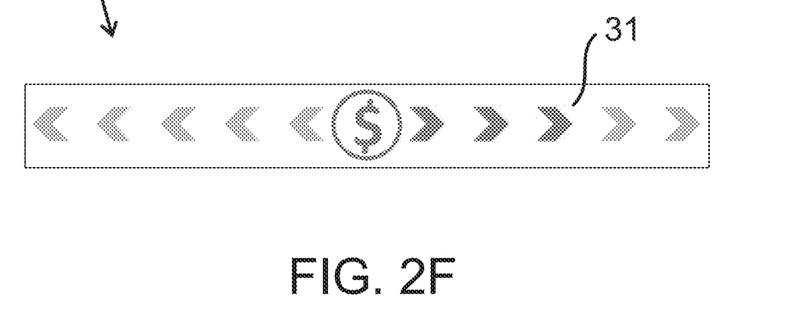
FIG. 2F shows the profitability indicator display indicating a moderately-profitable product where color further signifies profit.
Figure 2G:
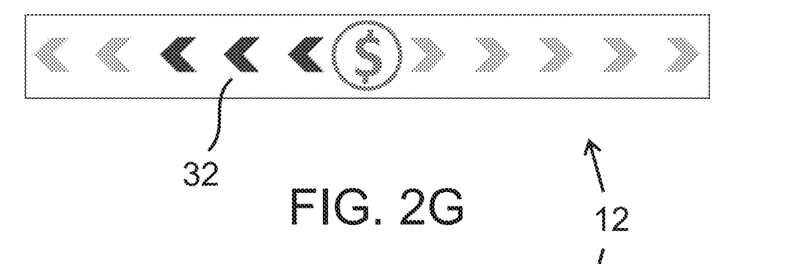
FIG. 2G shows the profitability indicator display indicating a moderately-unprofitable product where color further signifies unprofitability.
Figure 2H:
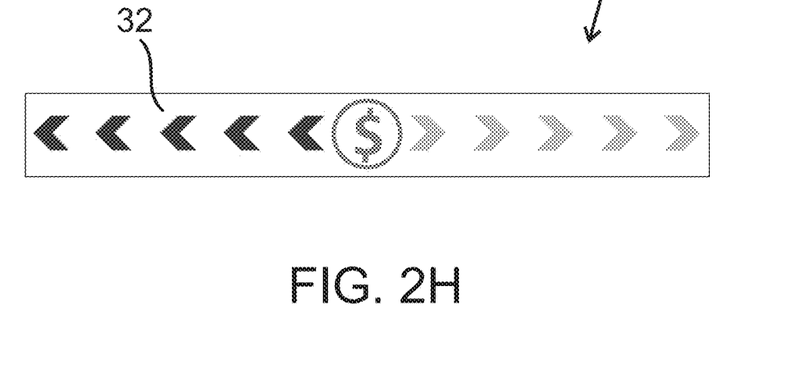
FIG. 2H shows the profitability indicator display indicating a most-unprofitable product where color further signifies unprofitability.

In one embodiment using color displays, marks of a first contrastive appearance are presented in one color which conveys greater profitability, and marks of a second contrastive appearance are presented in a second color which convey less profitability. See FIGS. 2E and 2F. When a more profitable product is being displayed using the profitability indicator, one or more marks 31 on the right side of the central symbol alternatively or additionally take on a green color. See FIGS. 2G and 2H. When a less profitable product is being displayed using the profitability indicator, one or more marks 32 on the left side of the central symbol take on a red color (FIGS. 1G, 1H). In either case the number of marks 31, 32 that take on a color is proportional to the magnitude of profitability of the product being displayed, and the color of the marks is indicative of the direction of profitability of the product being displayed.

The colors and forms of mark specified here and in the referenced drawings are exemplary, and are not to be considered as limitations or constraints.

The profitability indicator module is operatively coupled with the financial measurement gauge to display a visual indication of the profitability of each product selected by the product match module.

The profitability indicator module displays one or more alternative products with the entered product, with the alternative products arranged in the display from most profitable to least profitable as indicated by the profitability gauge for each alternative product as determined according to Table 1.

Figure 3:
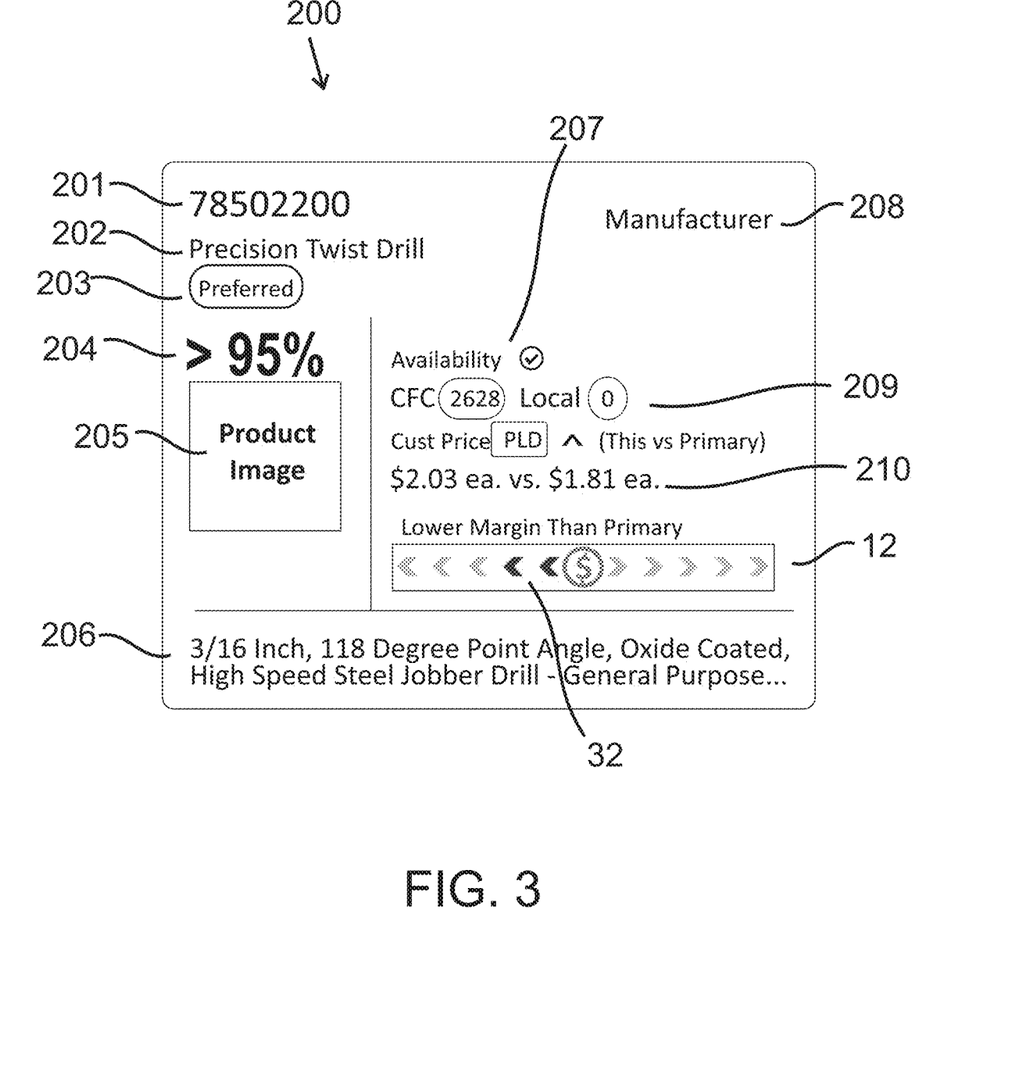
FIG. 3 shows an alternate product display element containing alternate product information including the profitability indicator display.

The profitability indicator module and resulting financial measurement gauge is integrated with or otherwise incorporated in displays of alternative products based on a given base product or selection criteria. FIG. 3 represents an illustrative display of a selected alternative product incorporating the profitability indicator of the present invention. The profitability indicator module displays on the computer one or more alternative products each with a set of attributes that are useful in selecting an alternative product, the set of attributes comprising part number 201, inventory 209, manufacturer 208, status 207, brand classification 202, profit 12 as indicated by the financial measurement gauge that comprises marks 32 with color, and number and percentage 204, selling price 210, popularity 203, product description 206, and an image 205. The profitability indicator module displays values of attributes for each alternative product for comparison with corresponding attribute values for the entered product to facilitate user selection of alternatives.

Figure 4:
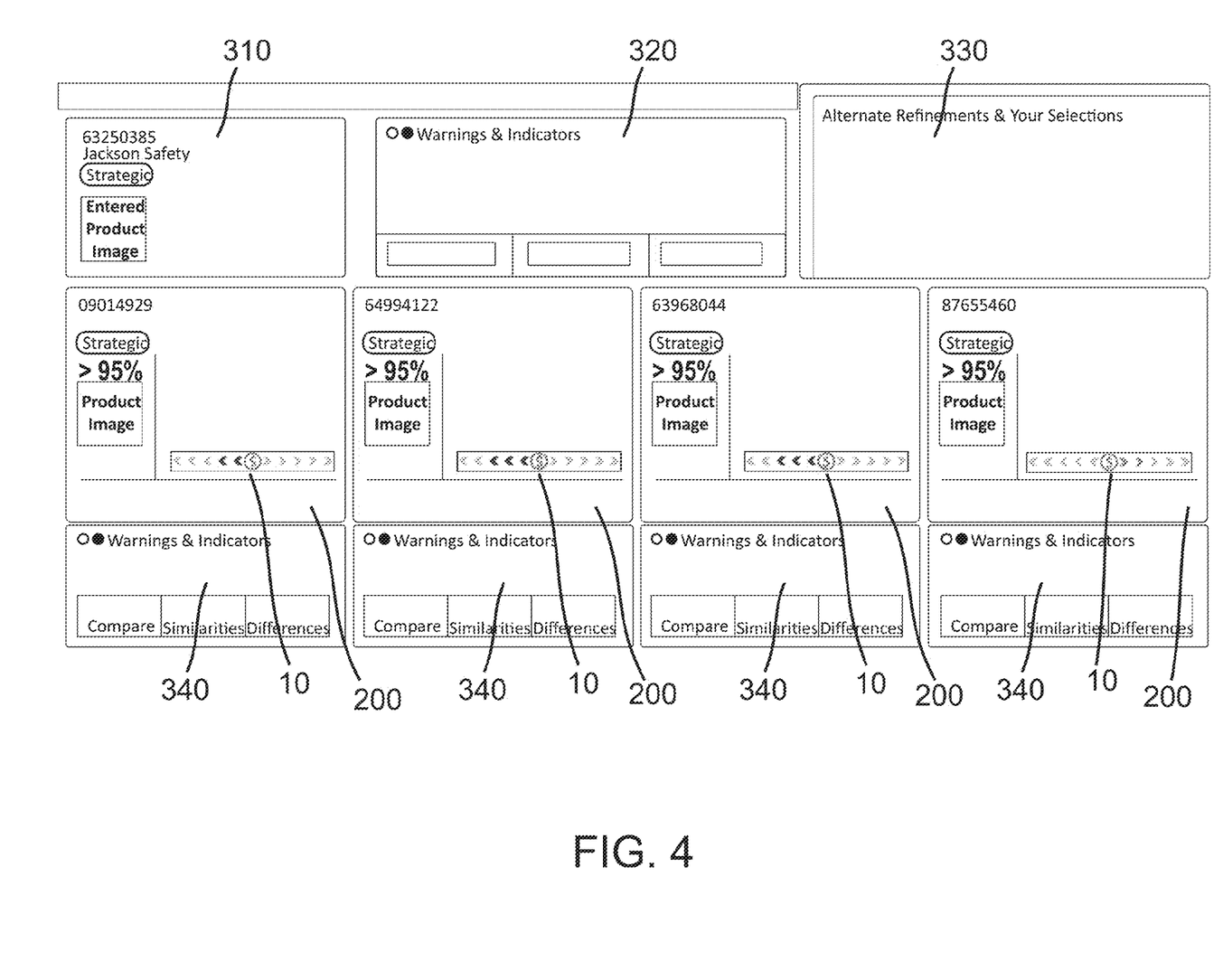
FIG. 4 shows a display of entered product information and a set of alternate product display elements each including a profitability indicator display for that alternate product.

FIG. 4 shows a display of four alternative products 200 and their profitability gauges 10, as displayed to a user with the entered product information 310, the warning indicators 320 for the entered product and 340 for the alternate products, and additional information 330 on alternate refinements and user selections.

Figure 5:
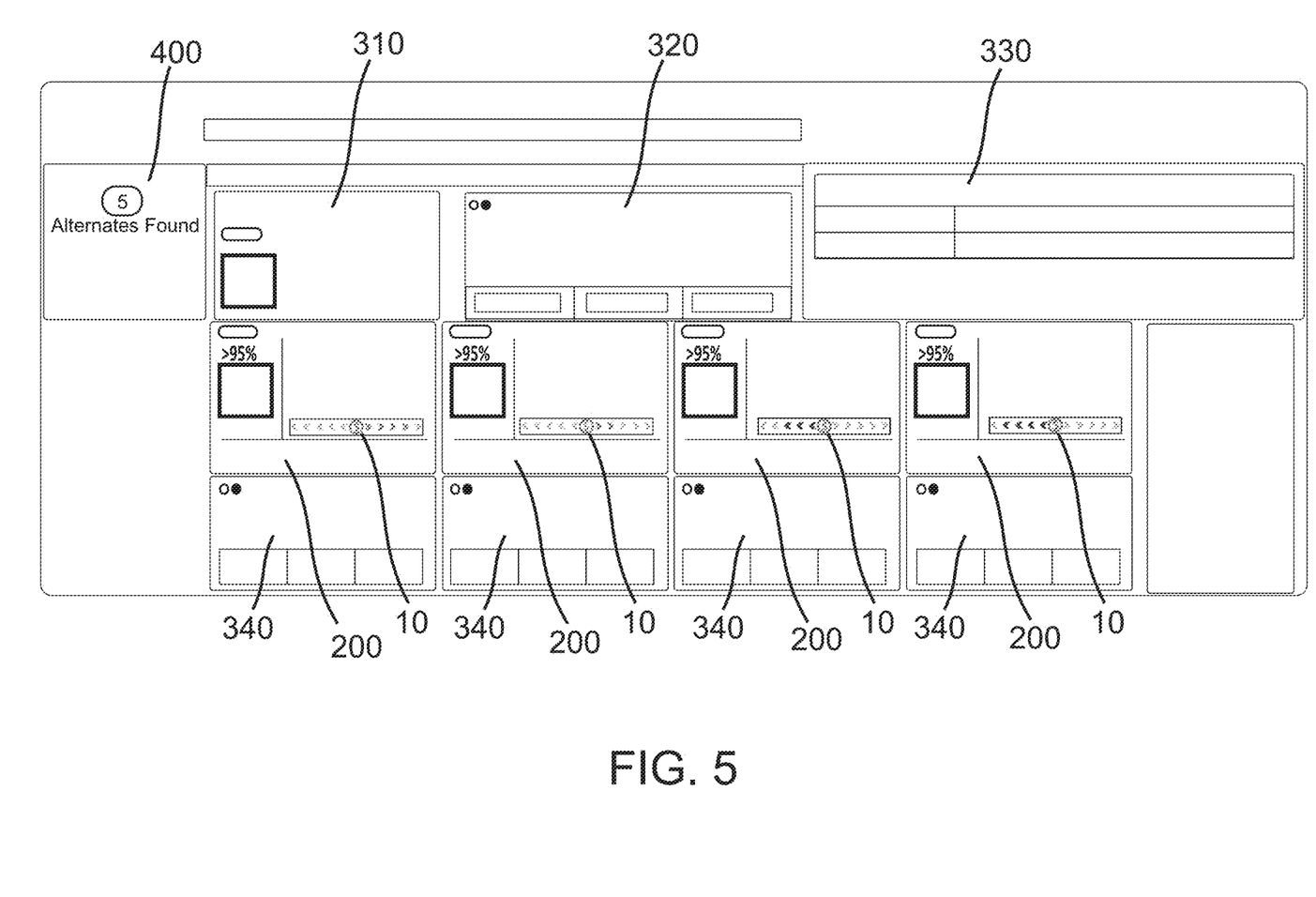
FIG. 5 shows a completed display of summary results for an entered product including entered product information and a set of alternate product display elements each including a profitability indicator display.

FIG. 5 shows an overview of the display in FIG. 4 as contained in a complete user screen display showing the total number of alternates found 400. This complete user display allows for ease of alternative product selection with a strong visual representation of profitability for each alternative product. Such strong visual representation is conveyed by way of the financial measurement gauges for each alternative product as well as the use of color to convey a further dimension to the profitability of each alternative product that has been displayed.

Figure 6:
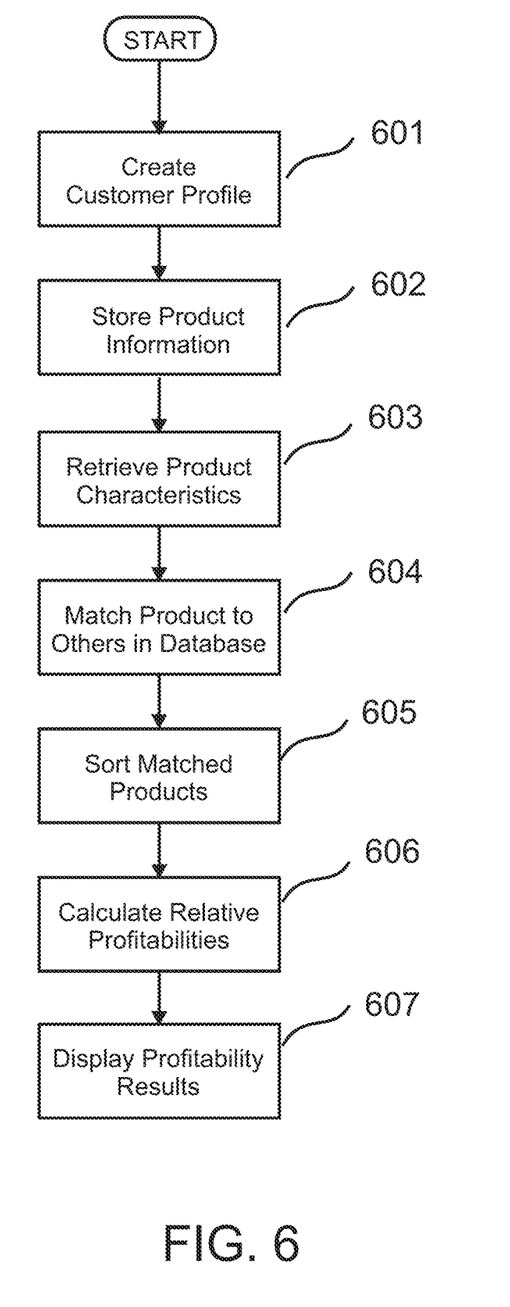
FIG. 6 is a continuing sequence of steps for implementing a profitability indicator display.

FIG. 6 is a continuing sequence of steps for implementing a profitability indicator display. In one embodiment of the present invention, product profitability for use in the profitability indicator is estimated by way of the steps depicted in FIG. 6 and described herein. In step 601, a user creates a customer profile on the computer. In step 602 the user stores product information in the form of a product database, file, or series of files on the computer or on a device or system accessible to or otherwise interconnected with the computer.

In the selling process, the user identifies a product to the product information module, which accesses the product database and in step 603 returns characteristics of the identified product including inventory, manufacturer, status, brand classification, profit, selling price, popularity, and an image of the product.

The product match module then compares the entered characteristics with the characteristics of other products in the product database, and in step 604 generates a candidate list of alternative products having characteristics matching or similar to those of the identified product, with the degree of similarity calculated as a critical match percentage. In step 605 the sort function of the product match module arranges the critical match percentages of the alternative products in order from highest to lowest value, and sorts the list of alternative products accordingly. The profitability module then compares the characteristics of the entered product with the characteristics of each matched alternative product, and in step 606 calculates the profitability of the matched alternative product with reference to the entered product. In step 607, the user interface displays the alternative products sorted in descending order according to their profitability, including in each alternative product's display the attributes having values similar to those of the entered product, the attributes having values different from those of the entered product, and the alternative product's brand classification.

In a local database embodiment of the present invention, the product database is stored on the computer. In a networked database embodiment of the present invention, the product database is stored remotely and is accessed by the computer via the network connection. Other distributed or consolidated network topologies are also to be considered and included with the present invention as described and claimed herein.

Having described and illustrated the principles, components and methods of the present invention by reference to one or more preferred embodiments, it should be apparent that the preferred embodiment(s) described and envisioned herein may be modified in arrangement and detail without departing from the spirit and broad scope of the present invention, and that these modifications and variations are to be considered and construed as being included in the present application and invention herein.

What is claimed is:

1. A computer based system for optimizing product selection to a user, the computer based system comprising:

a computer having a processor, memory, and access to computer readable media;

a computer program stored on non-transitory computer readable media having a customer profile module, a product information module, a product match module, a product sort module, and a product profitability indicator module;

a user interface displayed on a computer monitor for interaction with said computer program;

a network connection between the computer and a computer network for allowing remote access to the computer program;

a financial measurement gauge stored on the non-transitory computer readable media and capable of being graphically displayed with a display state on a computer monitor as a product profitability indicator having a central symbol with a quantity of marks horizontally displayed on the left side of the central symbol and a quantity of marks horizontally displayed on the right side of the central symbol, wherein the display state of the financial measurement gauge is driven by product profitability inputs from an entered product selection and alternative product selections entered by a user through the user interface;

wherein product profitability is determined by subtracting entered product profit from alternative product profit and dividing the result by entered product profit;

wherein entered product profit is determined based on customer specific price during a price and inventory call; and alternative product profit is determined based on the alternative item selling price for each alternative item sorted by match level of critical attributes;

and wherein the horizontal marks on the left side of the central symbol take on a first color to indicate a less profitable alternative product being displayed as compared to an entered product, and the horizontal marks on the right side of the central symbol alternatively take on a second color to indicate a more profitable alternative product being displayed as compared to the entered product, the quantity of horizontal marks that take on either color being proportional to the magnitude of profitability of the product being displayed and the color being indicative of the direction of profitability of the product being displayed;

the product profitability indicator module being operatively coupled with the financial measurement gauge to display a visual indication of the profitability of each product selected by the product match module.

2. The system for optimizing product selection to a user as recited in claim 1, wherein the product information module comprises inventory information for each product entered.

3. The system for optimizing product selection to a user as recited in claim 1, wherein the product information module comprises manufacturer information for each product entered.

4. The system for optimizing product selection to a user as recited in claim 1, wherein the product information module comprises status information for each product entered.

5. The system for optimizing product selection to a user as recited in claim 1, wherein the product information module comprises brand classification information for each product entered.

6. The system for optimizing product selection to a user as recited in claim 1, wherein the product information module comprises profit information for each product entered.

7. The system for optimizing product selection to a user as recited in claim 1, wherein the product information module comprises selling price information for each product entered.

8. The system for optimizing product selection to a user as recited in claim 1, wherein the product information module comprises popularity information for each product entered.

9. The system for optimizing product selection to a user as recited in claim 1, wherein the product information module comprises an image of each product entered.

10. The system for optimizing product selection to a user as recited in claim 1, wherein the product match module comprises a critical match percentage for each product that is matched with an entered product.

11. The system for optimizing product selection to a user as recited in claim 10, wherein the product match module comprises a sort function that arranges the critical match percentages from highest value to lowest value.

12. The system for optimizing product selection to a user as recited in claim 1, wherein the profitability indicator module comprises a relative profitability function that determines relative profitability of a matched product with reference to an entered product.

13. The system for optimizing product selection to a user as recited in claim 1, wherein the marks of the financial measurement gauge are chevrons.

14. The system for optimizing product selection to a user as recited in claim 1, wherein the central symbol of the financial measurement gauge is a dollar symbol.

15. The system for optimizing product selection to a user as recited in claim 1, wherein the plurality of marks comprise five marks on the left side of the central symbol and five marks on the right side of the central symbol.

16. A non-transitory computer readable medium and a financial measurement gauge stored on the non-transitory computer readable media and capable of being graphically displayed on a computer monitor with a display state as a product profitability indicator, the financial measurement gauge comprising a central symbol with a quantity of marks horizontally arranged on the left side of the central symbol and a quantity of marks horizontally arranged on the right side of the central symbol, wherein the display state of the financial measurement gauge is driven by product profitability inputs from an entered product selection and alternative product selections entered by a user through the user interface; wherein product profitability is determined by subtracting entered product profit from alternative product profit and dividing the result by entered product profit;

wherein entered product profit is determined based on customer specific price during a price and inventory call; and alternative product profit is determined based on the alternative item selling price for each alternative item sorted by match level of critical attributes;

and wherein the horizontal marks on the left side of the central symbol take on a first color to indicate a less profitable alternative product being displayed as compared to an entered product, and the horizontal marks on the right side of the central symbol alternatively take on a second color to indicated a more profitable alternative product being displayed as compared to the entered product, the quantity of horizontal marks that take on either color being proportional to the magnitude of profitability of the product being displayed and the color being indicative of the direction of profitability of the product being displayed.

17. A method for selecting an alternative product that is optimized for seller profitability with the computer based system of claim 1, the method comprising the steps of:

creating a customer profile on the computer based system of claim 1;

storing product information on the computer based system of claim 1;

entering identifying information for a selected product on the computer based system of claim 1;

matching the selected product with alternative products on the computer based system of claim 1;

providing alternative product information on a computer display;

providing a financial measurement gauge for each alternative product displayed as a product profitability indicator with a display state on a computer display;

wherein the financial measurement gauge comprises a central symbol with a quantity of marks horizontally arranged on the left side of the central symbol and a quantity of marks horizontally arranged on the right side of the central symbol, wherein the display state of the financial measurement gauge is driven by product profitability inputs from an entered product selection and alternative product selections entered by a user through the user interface;

wherein product profitability is determined by subtracting entered product profit from alternative product profit and dividing the result by entered product profit;

wherein entered product profit is determined based on customer specific price during a price and inventory call; and alternative product profit is determined based on the alternative item selling price for each alternative item sorted by match level of critical attributes;

and where the horizontal marks on the left side of the central symbol take on a first color to indicate a less profitable alternative product being displayed as compared to an entered product, and the horizontal marks on the right side of the central symbol alternatively take on a second color to indicate a more profitable alternative product being displayed as compared to the entered product, the quantity of horizontal marks that take on either color being proportional to the magnitude of profitability of the product being displayed and the color being indicative of the direction of profitability of the product being displayed.

18. The method for selecting an alternative product that is optimized for seller profitability as recited in claim 17, the method further comprising the step of arranging product information on a computer display from most profitable to least profitable as indicated by the financial measurement gauge for each product.

19. The method for selecting an alternative product that is optimized for seller profitability as recited in claim 17, further comprising the step of comparing similar attributes of the alternative products and displaying the similar attributes on a computer monitor.

20. The method for selecting an alternative product that is optimized for seller profitability as recited in claim 17, further comprising the step of comparing differing attributes of the alternative products and displaying the differing attributes on a computer monitor.

21. The method for selecting an alternative product that is optimized for seller profitability as recited in claim 17, further comprising the step of providing brand classification of the alternative products and displaying the brand classification on a computer monitor.

\* \* \* \* \*